United States Patent
Douady et al.

(10) Patent No.: US 11,228,712 B2
(45) Date of Patent: *Jan. 18, 2022

(54) SYSTEMS AND METHODS FOR STABILIZING VIDEOS

(71) Applicant: GoPro, Inc., San Mateo, CA (US)

(72) Inventors: Cesar Douady, Les Molieres (FR); Thomas Derbanne, Paris (FR); Maxim Karpushin, Paris (FR)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/992,479

(22) Filed: Aug. 13, 2020

(65) Prior Publication Data

US 2020/0374442 A1 Nov. 26, 2020

Related U.S. Application Data

(63) Continuation of application No. 16/391,705, filed on Apr. 23, 2019, now Pat. No. 10,750,092.
(Continued)

(51) Int. Cl.
*H04N 5/232* (2006.01)
*H04N 5/225* (2006.01)
*H04N 5/14* (2006.01)

(52) U.S. Cl.
CPC .......... *H04N 5/2328* (2013.01); *H04N 5/144* (2013.01); *H04N 5/2252* (2013.01);
(Continued)

(58) Field of Classification Search
None
See application file for complete search history.

(56) References Cited

U.S. PATENT DOCUMENTS 4,864,409 A * 9/1989 Platte ................. H04N 5/23258
348/208.6
6,654,019 B2 11/2003 Gilbert
(Continued)

FOREIGN PATENT DOCUMENTS

| WO | 2009047572 A1 | 4/2009 |
|---|---|---|
| WO | 2014042104 A1 | 3/2014 |
| WO | 2014090277 A1 | 6/2014 |

OTHER PUBLICATIONS

"Spatial Audio Lecture Series," Regents of the University of California at Berkeley, Center for New Music and Audio Technologies, 2015, 1 Page, [online] [retrieved on Aug. 20, 2015] Retrieved from the internet <URL:http:l/cnmat.berkelev.edu/spatialaudiolectures>.
(Continued)

*Primary Examiner* — Twyler L Haskins
*Assistant Examiner* — Wesley J Chiu
(74) *Attorney, Agent, or Firm* — Esplin & Associates, PC

(57) ABSTRACT

Visual content is captured by an image capture device during a capture duration. The image capture devices experiences motion during the capture duration. The intentionality of the motion of the image capture device is determined based on angular acceleration of the image capture device during the capture duration. A punchout of the visual content is determined based on the intentionality of the motion of the image capture device. The punchout of the visual content is used to generate stabilized visual content.

20 Claims, 9 Drawing Sheets

Related U.S. Application Data

(60) Provisional application No. 62/733,237, filed on Sep. 19, 2018.

(52) U.S. Cl.
CPC ......... *H04N 5/2253* (2013.01); *H04N 5/2254* (2013.01); *H04N 5/23258* (2013.01); *H04N 5/23267* (2013.01); *H04N 5/232933* (2018.08)

(56) References Cited

U.S. PATENT DOCUMENTS

| | | | |
|---|---|---|---|
| 6,982,746 B1 | 1/2006 | Kawahara | |
| 7,623,153 B2 * | 11/2009 | Hatanaka | H04N 5/23267 348/208.3 |
| 8,022,948 B2 | 9/2011 | Garbow | |
| 8,237,787 B2 | 8/2012 | Hollinger | |
| 9,144,714 B2 | 9/2015 | Hollinger | |
| 9,279,983 B1 | 3/2016 | Davis | |
| 9,363,569 B1 | 6/2016 | Van Hoff | |
| 9,374,532 B2 | 6/2016 | Grundmann | |
| 9,426,430 B2 | 8/2016 | Aguilar | |
| 9,787,902 B1 | 10/2017 | Beysserie | |
| 9,819,857 B2 | 11/2017 | Miyajima | |
| 10,015,308 B2 | 7/2018 | Cho | |
| 10,262,691 B1 | 4/2019 | Gilmour | |
| 10,271,021 B2 | 4/2019 | Smolyanskiy | |
| 10,284,794 B1 | 5/2019 | Francois | |
| 10,341,564 B1 | 7/2019 | Derbanne | |
| 10,432,864 B1 | 10/2019 | Douady | |
| 10,536,643 B1 | 1/2020 | Douady | |
| 10,542,215 B2 | 1/2020 | Kunishige | |
| 2003/0160862 A1 | 8/2003 | Charlier | |
| 2003/0210327 A1 | 11/2003 | Mory | |
| 2004/0010804 A1 | 1/2004 | Hendricks | |
| 2004/0125133 A1 | 7/2004 | Pea | |
| 2006/0291841 A1 | 12/2006 | Fukumoto | |
| 2008/0037970 A1 * | 2/2008 | Saito | H04N 5/23283 396/55 |
| 2008/0307329 A1 | 12/2008 | Endoh | |
| 2009/0278917 A1 | 11/2009 | Dobbins | |
| 2010/0033614 A1 | 2/2010 | Yoo | |
| 2010/0277617 A1 | 11/2010 | Hollinger | |
| 2010/0281375 A1 | 11/2010 | Pendergast | |
| 2010/0299630 A1 | 11/2010 | McCutchen | |
| 2011/0013778 A1 | 1/2011 | Takumai | |
| 2011/0063236 A1 | 3/2011 | Arai | |
| 2011/0102609 A1 * | 5/2011 | Iwata | H04N 5/23261 348/208.4 |
| 2011/0242352 A1 | 10/2011 | Hikosaka | |
| 2012/0081558 A1 * | 4/2012 | Ogura | H04N 5/23254 348/208.6 |
| 2012/0105654 A1 | 5/2012 | Kwatra | |
| 2012/0137236 A1 | 5/2012 | Abe | |
| 2013/0002813 A1 | 1/2013 | Vaught | |
| 2013/0058535 A1 | 3/2013 | Othmezouri | |
| 2013/0141600 A1 * | 6/2013 | Proca | H04N 5/272 348/208.2 |
| 2013/0177168 A1 | 7/2013 | Inha | |
| 2013/0182134 A1 | 7/2013 | Grundmann | |
| 2013/0210563 A1 | 8/2013 | Hollinger | |
| 2013/0250047 A1 | 9/2013 | Hollinger | |
| 2013/0329132 A1 | 12/2013 | Tico | |
| 2013/0343728 A1 | 12/2013 | Kitatani | |
| 2014/0028876 A1 | 1/2014 | Mills | |
| 2014/0039884 A1 | 2/2014 | Chen | |
| 2014/0063271 A1 | 3/2014 | Ogura | |
| 2014/0063272 A1 * | 3/2014 | Tsuchida | H04N 5/23267 348/208.2 |
| 2014/0160309 A1 | 6/2014 | Karpenko | |
| 2014/0266773 A1 | 9/2014 | Aguilar | |
| 2014/0267586 A1 | 9/2014 | Aguilar | |
| 2014/0267590 A1 | 9/2014 | McClatchie | |
| 2015/0022677 A1 | 1/2015 | Guo | |
| 2015/0146014 A1 | 5/2015 | Black | |
| 2015/0159846 A1 | 6/2015 | Hollinger | |
| 2015/0189178 A1 | 7/2015 | Lombardi | |
| 2015/0350548 A1 | 12/2015 | Beysserie | |
| 2016/0006935 A1 | 1/2016 | Zhou | |
| 2016/0048216 A1 * | 2/2016 | Fink | H04N 5/23258 345/156 |
| 2016/0124917 A1 | 5/2016 | Ducat | |
| 2016/0191800 A1 | 6/2016 | Yoshikawa | |
| 2016/0224225 A1 | 8/2016 | Kondo | |
| 2016/0227105 A1 | 8/2016 | Kobayashi | |
| 2016/0255273 A1 | 9/2016 | Wakamatsu | |
| 2016/0360109 A1 | 12/2016 | Laroia | |
| 2017/0041545 A1 | 2/2017 | Murgia | |
| 2017/0070689 A1 | 3/2017 | Silverstein | |
| 2017/0078577 A1 * | 3/2017 | Wakamatsu | H04N 5/23267 |
| 2017/0084086 A1 | 3/2017 | Pio | |
| 2017/0085740 A1 | 3/2017 | Lin | |
| 2017/0085964 A1 | 3/2017 | Chen | |
| 2017/0094169 A1 | 3/2017 | Yoshikawa | |
| 2017/0142337 A1 | 5/2017 | Kokaram | |
| 2017/0289454 A1 | 10/2017 | Pettersson | |
| 2017/0359534 A1 | 12/2017 | Li | |
| 2018/0041705 A1 | 2/2018 | Wakamatsu | |
| 2018/0048821 A1 | 2/2018 | Segapelli | |
| 2018/0121057 A1 | 5/2018 | Liang | |
| 2018/0199025 A1 | 7/2018 | Holzer | |
| 2018/0220073 A1 | 8/2018 | Keal | |
| 2018/0309930 A1 * | 10/2018 | Gyotoku | H04N 5/2254 |
| 2018/0324358 A1 | 11/2018 | Yamada | |
| 2019/0124267 A1 * | 4/2019 | Haruna | H04N 5/23287 |
| 2019/0191090 A1 | 6/2019 | Murashima | |
| 2019/0215495 A1 | 7/2019 | Smolyanskiy | |
| 2019/0348075 A1 | 11/2019 | Derbanne | |

OTHER PUBLICATIONS

International Search Report and Written Opinion for Application No. PCT/US2019/020241, dated Jun. 3, 2019, 12 pages.

International Search Report and Written Opinion for Application No. PCT/US2019/031591, dated Jun. 18, 2019, 7 pages.

International Search Report and Written Opinion for Application No. PCT/US2019/048292, dated Sep. 27, 2019, 7 pages.

International Search Report for Application No. PCT/US19/48368, dated Nov. 7, 2019, 10 pages.

Kamali et al., "Stabilizing Omnidirectional Videos Using 3D Structure and Spherical Image Warping", MVA2011 IAPR Conference on Machine Vision Applications, Jun. 13-15, 2011, Nara, Japan, pp. 177-180. (Year: 2011).

Kopf et al., "First-person Hyper-Lapse Videos" ACM Transactions on Graphics (Proceedings of SIGGRAPH 2014), 33(4), Article No. 78, 2014 (10 pages).

O'Donovan, A., et al., "Audio-Visual Panoramas and Spherical Audio Analysis using the Audio Camera," C1 Proceedings of the 16th International Conference on Auditory Display, Jun. 9-15, 2010, pp. ICAD-167-168, can be retrieved at <URL: https://smartech.gatech.edu/bitstream/handle/1853/49858/0%27DonovanDuraiswami201 O.pdf?sequence=1 >.

O'Donovan, A., et al., "Real Time Capture of Audio Images and their Use with Video," 2007 IEEE Workshop on Applications of Signal Processing to Audio and Acoustics, Oct. 21-24, 2007, pp. 10-13.

PCT International Search Report and Written Opinion for PCT/US15/38913, dated Sep. 29, 2015, 15 Pages.

United States Office Action, U.S. Appl. No. 14/789,706, dated Jun. 7, 2016, 10 pages.

\* cited by examiner maximum positive rotation 710 axis 712 viewing window 714 maximum negative rotation 720 axis 712 viewing window 714

SYSTEMS AND METHODS FOR STABILIZING VIDEOS

FIELD

This disclosure relates to stabilizing videos using motion of an image capture device during a capture duration.

BACKGROUND

A video may have been captured by an image capture device in motion. The motion of the image capture device during the capture of the video may cause the video to appear jerky/shaky.

SUMMARY

This disclosure relates to stabilizing videos. Visual content having a field of view may be captured by an image capture device during a capture duration. Visual information defining the visual content, angular acceleration information characterizing angular accelerations of the image capture device at different moments within the capture duration, and/or other information may be obtained. Intentionality of motion of the image capture device as a function of progress through the capture duration may be determined based on the angular acceleration information and/or other information. A viewing window for the visual content as a function of progress through the capture duration may be determined based on the intentionality of the motion of the image capture device and/or other information. The viewing window may define one or more extents of the visual content. Stabilized visual content of a video may be generated based on the viewing window and/or other information. The stabilized visual content may include a punchout of the extent(s) of the visual content within the viewing window.

A system that stabilizes videos may include one or more electronic storages, one or more processors, and/or other components. An electronic storage may store visual information defining visual content, information relating to visual content, angular acceleration information characterizing angular accelerations of an image capture device, information relating to angular accelerations of an image capture device, information relating to intentionality of motion of the image capture device, information relating to a field of view of an optical element, information relating to a viewing window, information relating to stabilized visual content, information relating to a punchout of visual content, and/or other information. In some implementations, the system may include one or more optical elements, one or more image sensors, one or more angular acceleration sensors, and/or other components. In some implementations, the system may include one or more displays. Stabilized visual content may be presented on the display(s) as a preview of a video.

One or more components of the system may be carried by a housing, such as a housing of an image capture device. For example, the optical element(s), the image sensor(s), and/or the angular acceleration sensor(s) of the system may be carried by the housing of an image capture device. The housing may carry other components, such as the processor(s), the electronic storage, and/or the display(s).

An optical element may be configured to guide light within a field of view to an image sensor. The field of view may be larger than a size of the punchout/viewing window used to generate stabilized visual content. An image sensor may be configured to generate a visual output signal based on light that becomes incident thereon during a capture duration. The visual output signal may convey visual information that defines visual content having the field of view.

An angular acceleration sensor may be configured to generate an angular acceleration output signal based on angular accelerations of the housing during the capture duration. The angular acceleration output signal may convey angular acceleration information that characterizes the angular accelerations of the housing at different moments within the capture duration. In some implementations, the angular acceleration sensor may include one or more of a gyroscope, an accelerometer, and/or an inertial measurement unit. The angular acceleration information may be determined independent of the visual information.

The processor(s) may be configured by machine-readable instructions. Executing the machine-readable instructions may cause the processor(s) to facilitate stabilizing videos. The machine-readable instructions may include one or more computer program components. The computer program components may include one or more of an intentionality component, a viewing window component, a generation component, and/or other computer program components.

The intentionality component may be configured to determine intentionality of motion of the housing based on the angular acceleration information and/or other information. The intentionality of the motion of the housing may be determined as a function of progress through the capture duration.

In some implementations, the intentionality of the motion of the housing may be determined as being one or more of fully intentional, fully unintentional, intermediately intentional, and/or other categories of intentionality.

In some implementations, the intentionality of the motion of the housing may be determined as being fully intentional based on the angular acceleration of the housing being smaller than a fully intentional angular acceleration threshold value and/or other information. The intentionality of the motion of the housing may be determined as being fully unintentional based on the angular acceleration of the housing being greater than a fully unintentional angular acceleration threshold value and/or other information. The fully intentional angular acceleration threshold value may be smaller than the fully unintentional angular acceleration threshold value.

In some implementations, determination of the intentionality of the motion of the housing as being intermediately intentional may include determination of a value of intentionality between a fully intentional value and a fully unintentional value.

The viewing window component may be configured to determine a viewing window for the visual content based on the intentionality of the motion of the housing and/or other information. The viewing window may be determined as the function of progress through the capture duration. The viewing window may define one or more extents of the visual content.

In some implementations, the viewing window for the visual content may be determined as the function of progress through the capture duration based on the intentionality of the motion of the housing such that the viewing window for the visual content is centered on a center of the field of view for one or more portions of the capture duration in which the intentionality of the motion of the housing is determined as being fully intentional. The viewing window for the visual content may deviate from the center of the field of view for one or more portions of the capture duration in which the intentionality of the motion of the housing is determined as being fully unintentional.

In some implementations, placement of the viewing window for the visual content with respect to the field of view of the visual content may be determined based on a centering parameter and/or other information. The centering parameter may move the viewing window towards the center of the field of view. An impact of the centering parameter on the placement of the viewing window may be determined based on the intentionality of the motion of the housing and/or other information.

In some implementations, placement of the viewing window for the visual content with respect to the field of view of the visual content may be determined based on an inertia parameter and/or other information. The inertia parameter may maintain one or more portions of speed of movement of the viewing window. An impact of the inertia parameter on the placement of the viewing window may be determined based on the intentionality of the motion of the housing and/or other information.

In some implementations, placement of the viewing window for the visual content with respect to the field of view of the visual content may be determined based on a deviation parameter and/or other information. The deviation parameter may limit deviation of the viewing window from the center of the field of view and/or other information.

The generation component may be configured to generate stabilized visual content of a video based on the viewing window and/or other information. The stabilized visual content may include a punchout of the extent(s) of the visual content within the viewing window. In some implementations, the stabilized visual content may be different from visual content of the video.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
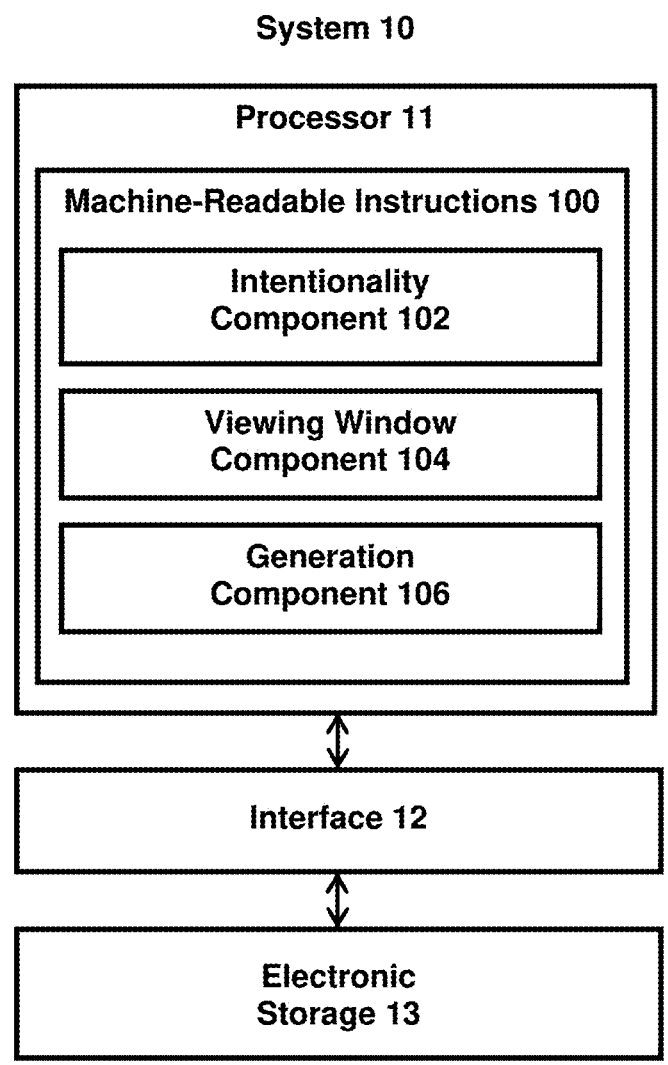
FIG. 1 illustrates an example system that stabilizes videos.

FIG. 1 illustrates a system 10 for stabilizing videos. The system 10 may include one or more of a processor 11, an interface 12 (e.g., bus, wireless interface), an electronic storage 13, and/or other components. In some implementations, the system 10 may include one or more optical elements, one or more image sensors, one or more angular acceleration sensors, one or more displays, and/or other components. Visual content having a field of view may be captured by an image capture device during a capture duration. Visual information defining the visual content, angular acceleration information characterizing angular accelerations of the image capture device at different moments within the capture duration, and/or other information may be obtained by the processor 11. Intentionality of motion of the image capture device as a function of progress through the capture duration may be determined based on the angular acceleration information and/or other information. A viewing window for the visual content as a function of progress through the capture duration may be determined based on the intentionality of the motion of the image capture device and/or other information. The viewing window may define one or more extents of the visual content. Stabilized visual content of a video may be generated based on the viewing window and/or other information. The stabilized visual content may include a punchout of the extent(s) of the visual content within the viewing window. In some implementations, the stabilized visual content may be presented on the display(s) as a preview of a video.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information defining visual content, information relating to visual content, angular acceleration information characterizing angular accelerations of an image capture device, information relating to angular accelerations of an image capture device, information relating to intentionality of motion of the image capture device, information relating to a field of view of an optical element, information relating to a viewing window, information relating to stabilized visual content, information relating to a punchout of visual content, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate stabilizing videos. The machine-readable instructions 100 may include one or more computer program components. The machine-readable instructions 100 may include one or more of an intentionality component 102, a viewing window component 104, a generation component 106, and/or other computer program components.

Images with a field of view may be captured by an image capture device during a capture duration. A field of view of an image may define a field of view of a scene captured within the image. A capture duration may be measured and/or defined in terms of time durations and/or frame numbers. For example, images may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, image sensor(s) and angular acceleration sensor(s) of the system 10 may be carried by the housing of the image capture device. The housing may carry other components, such as the processor 11, one or more optical elements, and/or one or more displays.

Figure 3:
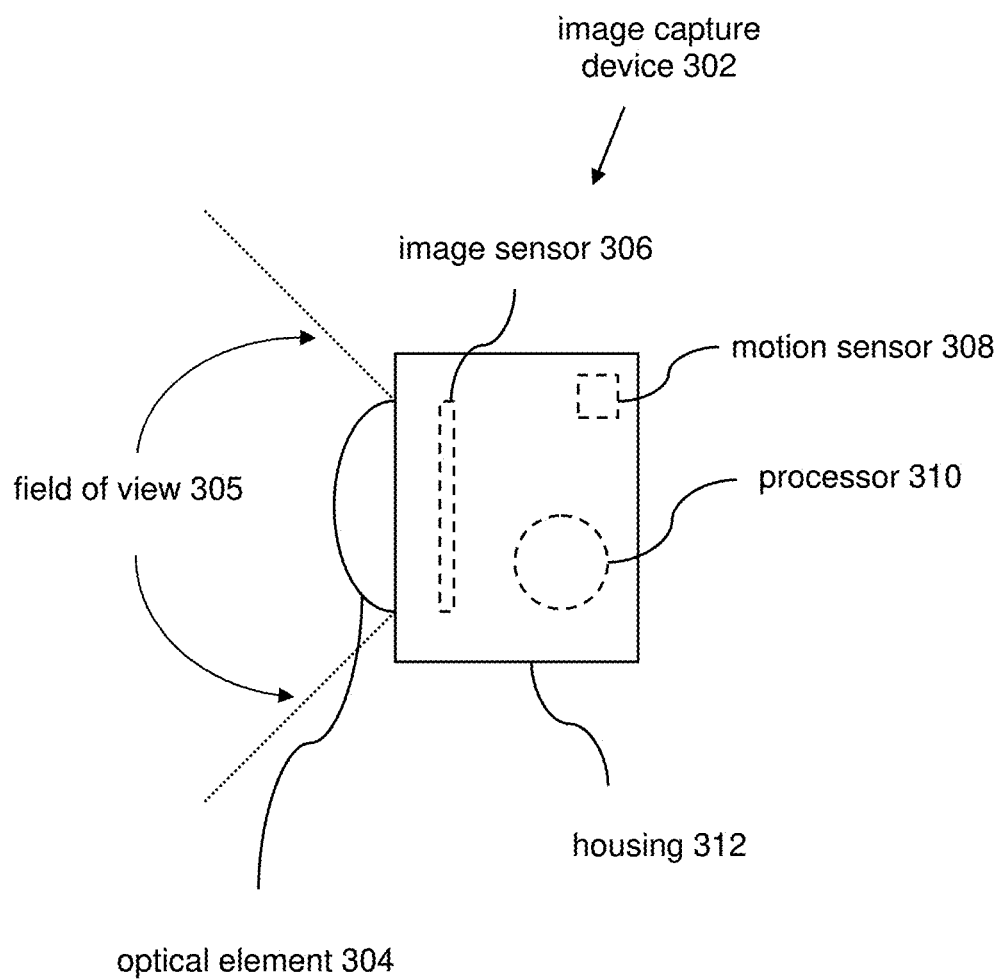
FIG. 3 illustrates an example image capture device.

An image capture device may refer to a device for recording visual information in the form of images, videos, and/or other media. An image capture device may be a standalone device (e.g., camera) or may be part of another device (e.g., part of a smartphone). FIG. 3 illustrates an example image capture device 302. The image capture device 302 may include a housing 312, and the housing 312 may carry (be attached to, support, hold, and/or otherwise carry) an optical element 304, an image sensor 306, a motion sensor 308, a processor 310, and/or other components. In some implementations, the image capture device 302 may include one or more displays (e.g., one or more displays carried by the housing 312). The display(s) may be used to present visual content (of images, of videos) captured by the image capture device 302. The display(s) may be used to present previews of visual content captured by the image capture device 302. For example, the image capture device 302 may be used to capture a video, and the display(s) may be used to present a preview of the video being captured. The preview of the video may be presented during capture of the video. That is, while the image capture device 302 is recording the video, the preview of the video being recorded may be presented on the display(s). Other configurations of image capture devices are contemplated.

The optical element 304 may include instrument(s), tool (s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306. The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than or equal to 180-degrees. In some implementations, the field of view 305 may be smaller than or equal to 180-degrees.

The field of view 305 may be larger than a size of the punchout/viewing window used to generate stabilized visual content. Portions of the images captured from light within the field of view 305 may be presented on a display and/or used to generate a video. The portions of the images presented on the display/used to generate a video may include those portions of the images within a viewing window. A viewing window may define extents of the visual content of the images to be included within a punchout. The viewing window may be determined so that the visual content within the presentation/generated video does not appear shaky/jerky or appears less shaky/jerky. For example, the shape, size, and/or the location of the viewing window within the images may be determined to compensate for motion of the image capture device 302 during capture such that the presentation/video appears to have been captured from an image capture device 302 with less motion. The visual content within such presentations/videos may be referred to as stabilized visual content.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured to generate visual output signals conveying visual information (defining visual content of images and/or videos) based on light that becomes incident thereon and/or other information. For example, the image sensor 306 may be configured to generate a visual output signal based on light that becomes incident thereon during a capture duration. The visual output signal may convey visual information that defines visual content having the field of view 305.

The motion sensor 308 may include sensor(s) that measures experienced positions and/or motions. The motion sensor 308 may converts experienced positions and/or motions into output signals. The output signals may include electrical signals. The motion sensor 308 may be configured to generate output signals conveying information that characterizes motions and/or positions of the motion sensor 308 and/or device(s) carrying the motion sensor 308, such as the image capture device 306 and/or the housing 312. The motion of the image capture device 306 may be the same as the motion of the housing 312. References to motion of a housing of an image capture device may refer to motion of the image capture device, and vice versa.

Position measured by the motion sensor 308 may include translational positions, rotational position, and/or other aspects of position of the image capture device 302. Motion measured by the motion sensor 308 may include speed of motion, acceleration of motion, direction of motion (translational direction and/or angular direction), and/or other aspects of motion of the image capture device 302. For example, the motion sensor 308 may refer to a set of angular acceleration sensors (one or more angular acceleration sensors), which may include one or more inertial measurement units, one or more accelerometers, one or more gyroscopes, and/or other angular acceleration sensors. The motion sensor 308 may generate output signals conveying information that characterizes motion of the motion sensor 308 and/or device(s) carrying the motion sensor 308.

For example, the motion sensor 308 may be configured to generate an angular acceleration output signal based on angular accelerations of the housing 312/image capture device 302 during the capture duration. The angular acceleration output signal may convey angular acceleration information that characterizes angular accelerations of the housing 312/image capture device 302 at different moments (points in time, time durations) within the capture duration. Other output signals (e.g., translational acceleration output signal, angular position output signal, translational position output signal), other position information (e.g., translational position information, angular position information), and other motion information (e.g., translational acceleration information, angular velocity information, translational velocity information) are contemplated.

Position and/or motion measured by the motion sensor 308 may be used to determine the intentionality of motion experienced by the image capture device 302 during a capture duration. For example, angular acceleration of the image capture device 302 during a capture duration may be used to determine intentionality of the motion experienced by the image capture device 302 during the capture duration. Intentionality of the motion of the image capture device 302 may refer to whether the motion experienced by the image capture device 302 was intended by the user of the image capture device 302. Position and/or motion measured by the motion sensor 308 may be used to determine whether the user intended to move the image capture device 302 in one or more ways during the capture duration. For example, angular acceleration of the image capture device 302 may be used to determine whether a pitch, a pan, a rotation, and/or other motion of the image capture device 302 during a capture duration was intended by the user. Use of other position and/or other motion of the image capture device 302 to determine the intentionality of motion of an image capture device are contemplated.

Intentionality of the image capture device 302 may be used to stabilize the visual content captured by the image capture device 302. The visual content may be stabilized by using a punchout of the visual content. The punchout may include extent(s) of the visual content within a viewing window, and one or more aspects of the viewing window (e.g., size of the viewing window, shape of the viewing window, location of the viewing window within images captured by the image capture device 302) may be determined based on the intentionality of the image capture device 302.

Position information (e.g., translational position information, angular position information) and/or motion information of the image capture device 302 (e.g., angular acceleration information, translational acceleration information, angular velocity information, translational velocity information) may be determined based on signals generated by the motion sensor 308 and independent of the information/signals generated by the image sensor 306. For example, angular acceleration information may be determined without using images/videos generated by the image sensor 306. Use of images/videos to determine angular accelerations/motions of the housing 312/image capture device 302 may be computationally expensive in terms of processing power, processing time, and/or battery consumption. Using the information/signals from the motion sensor 308 to determine angular accelerations/motions of the housing 312/image capture device 302 may be computationally cheaper. That is, less processing power, processing time, and/or battery consumption may be required when angular accelerations/motions of the housing 312/image capture device 302 are determined from the information/signals from the motion sensor 308 than from the information/signals from the image sensor 306.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or the motion sensor 308, and/or facilitate transfer of information from the image sensor 306 and/or the motion sensor 308 to another device/component. The processor 310 may be remote from the processor 11 or local to the processor 11. One or more portions of the processor 310 may be part of or remote from the processor 11. One or more portions of the processor 10 may be part of or remote from the processor 310. The processor 310 may include and/or perform one or more functionalities of the processor 11 shown in FIG. 1.

Referring back to FIG. 1, the processor 11 (or one or more components of the processor 11) may be configured to obtain information to facilitate stabilizing videos. Obtaining information may include one or more of accessing, acquiring, analyzing, determining, examining, identifying, loading, locating, opening, receiving, retrieving, reviewing, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, a motion sensor) and/or one or more software components (e.g., software running on a computing device).

For example, the processor 11 (or one or more components of the processor 11) may obtain visual information defining visual content (e.g., visual content of images/video frames) having a field of view, acceleration information characterizing angular accelerations of the image capture device/housing at different moments within a capture duration, and/or other information. One or more information may be obtained during acquisition of the visual content and/or after acquisition of the visual content by an image capture device. For example, visual information, angular acceleration information, and/or other information may be obtained while the visual content is being captured by an image capture device and/or after the visual content has been captured and stored in memory (e.g., the electronic storage 13)

The intentionality component 102 may be configured to determine intentionality of motion of the image capture device/housing based on the position information, the motion information, and/or other information. The type and/or extent of position and/or motion experienced by the image capture device during the capture duration may be used as an indicator of whether the motion of the image capture device was intended or unintended. For example, the intentionality component may be configured to determine intentionality of motion of the image capture device/housing based on the angular acceleration information and/or other information. Use of other position information, other motion information, combination of multiple types of position information, combination of multiple types of motion information, and/or combination of position information and motion information to determine the intentionality of the motion of the image capture device/housing are contemplated.

Intentionality of motion of an image capture device may refer to whether the motion experienced by the image capture device was intended by the user of the image capture device. For example, the image capture device may have been pitched, panned, rotated, and/or other moved during a capture duration, and the intentionality of the motion of the image capture device may characterize the extent to which the pitching, panning, rotating, and/or other motion of the image capture device was intended by the user.

For instance, a user may have captured a video using a handheld image capture device. The user's hand may have unintentionally moved during the capture of the video, such as due to the user's hand shaking, the user being bumped, the user riding on a vehicle that is experiencing vibration, and/or other unintentional motion. Such unintended motion of the image capture device may result in the video including shaky and/or jerky footage. Removing the effect of such unintended motion from the video may stabilize the visual content of the video.

The user's hand may have intentionally moved during the capture of the video, such as to keep a moving subject within the field of view of the image capture device, to provide a panning view of a scene, and/or for other intended motion. Preserving the effect of such intended motion within the video may preserve the content (e.g., subjects, activity, effect, story) the user wished to capture within the video.

Stabilized visual content may be generated to provide a smoother view of the captured visual content. Generation of stabilized visual content may include using smaller visual portions of the captured visual content (e.g., smaller visual portions of images/video frames) to provide a punchout view of the captured visual content. The stabilized visual content may provide a more stable view of the captured visual content than when the entirety of the captured visual content is presented (e.g., in a preview, in a video). The intentionality of the motion of the image capture device may be used to remove the effect of unintended motion (e.g., high frequency motion, shakes, jerks) from the stabilized visual content while preserving the effect of intended motion (e.g., panning left and right, pitching up and down to follow a subject, rotating clockwise/counterclockwise to capture non-leveled view of a scene) within the stabilized visual content. The intentionality of the motion of the image capture device may be used to preserve intended motion in the stabilized visual content while attenuating unintended motion in the stabilized visual content.

The intentionality of the motion of the image capture device/housing may be determined as a function of progress through the capture duration. That is, the intentionality of the motion may be determined for different parts of the capture duration. For example, the intentionality of the motion may be determined for different time points and/or different time durations within the capture duration. The intentionality of the motion may be determined for different images/video frames and/or different groups of images/video frames captured during the capture duration. The intentionality of the motion may be determined during the capture duration. For example, as images are captured during the capture duration, the intentionality of the motion for the captured images may be determined while other images are being captured. The intentionality of the motion may be determined after the capture duration. For example, the intentionality of the motion for different portions of the capture duration may be determined after all of the images have been captured.

In some implementations, the intentionality of the motion of the image capture device/housing may be determined as falling within one or more categories of intentionality. Categories of intentionality may include classes and/or division of intentionality, with individual classes/divisions corresponding to different degrees (e.g., amount, level, type) of intentionality. For example, categories of intentionality may include one or more of fully intentional, fully unintentional, intermediately intentional, and/or other categories of intentionality, and the intentionality of the motion of the image capture device/housing may be determined as being one or more of these categories.

Motion classified as being fully intentional may include motion determined by the intentionality component 102 as including motion intended by the user. Motion classified as being fully intentional may be preserved within the stabilized visual content. Motion classified as being fully unintentional may include motion determined by the intentionality component 102 as including motion unintended by the user. Motion classified as being fully unintentional may be attenuated within the stabilized visual content. Motion classified as being intermediately intentional may include motion determined by the intentionality component 102 as including motion partially intended/partially unintended by the user. Motion classified as being intermediately unintentional may be attenuated within the stabilized visual content. Motion classified as being intermediately unintentional may be attenuated less than motion classified as being fully unintentional in the stabilized visual content.

In some implementations, the intentionality of the motion of the image capture device/housing may be determined as being fully intentional based on one or more motion (e.g., angular acceleration) of the image capture device/housing being smaller than a fully intentional motion threshold value (e.g., fully intentional angular acceleration threshold value) and/or other information. The intentionality of the motion of the image capture device/housing may be determined as being fully unintentional based on one or more motion (e.g., angular acceleration) of the image capture device/housing being greater than a fully unintentional motion threshold value (e.g., fully unintentional angular acceleration threshold value) and/or other information. The fully intentional motion threshold value may be smaller than the fully unintentional motion threshold value. For example, fully intentional angular acceleration threshold value may be set at $200°/s^2$ and fully unintentional angular acceleration threshold value may be set at $2000°/s^2$. Other threshold values are contemplated.

In some implementations, determination of the intentionality of the motion of the image capture device/housing as being intermediately intentional may include determination of a value of intentionality between a fully intentional value and a fully unintentional value. For instance, the intentionality of the motion may be determined as values of a stabilizer state variable, with the values of the stabilizer state variable corresponding to the degrees of intentionality as a function of progress through the capture duration. The values of the stabilizer state variable may be determined for different images and/or group of images captured during the capture duration and/or for different points in times and/or durations of time within the capture duration. The value of the stabilizer state variable may range between the fully intentional value (e.g., minimum value, maximum value) and the fully unintentional value (e.g., maximum value, minimum value).

Figure 4:
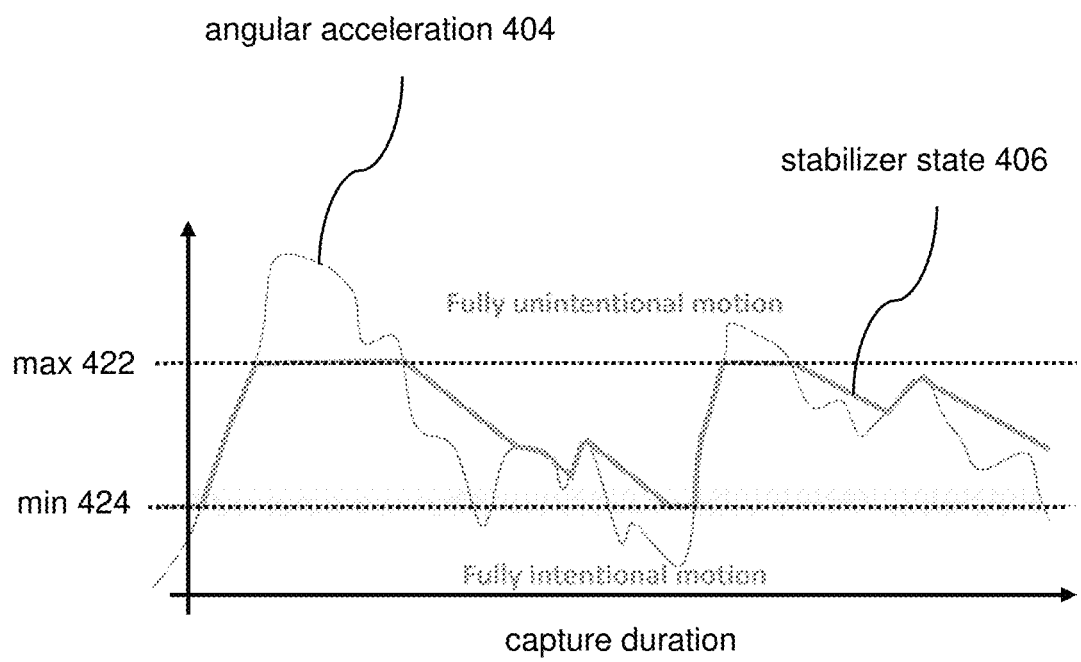
FIG. 4 illustrates examples curves of angular acceleration and stabilizer state.

For example, FIG. 4 illustrates example curves of angular acceleration 404 and stabilizer state 406. The curve of stabilizer state 406 may show values of the stabilizer state 406, which may range between a maximum value (max 422, fully unintentional value) and a minimum value (min 424, fully intentional value). The maximum value may indicate the intentionality of the motion being fully unintended, and the minimum value may indicate the intentionality of the motion being fully intended. Values between the maximum value and the minimum value may indicate the intentionality of the motion being intermediately intended.

The values of the stabilizer state 406 may be determined based on values of the angular acceleration 404 and/or other information. For example, the values of the stabilizer state 406 may be determined to follow the angular acceleration 404. That is, the values of the stabilizer state 406 may increase with increase in angular acceleration 404 and may decrease with decrease in angular acceleration 404. The values of the stabilizer state 306 may not increase above the maximum value (max 422) and may not decrease below the minimum value (min 424).

The values of the stabilizer state 406 may be changed differently based on whether the angular acceleration 404 is increasing or decreasing. For example, positive change in angular acceleration 404 may be reflected immediately in the values of the stabilizer state 406 stabilizer state 406 (e.g., increase in acceleration at a moment causes stabilizer state 406 for the moment to be increased) while negative change in angular acceleration 404 may be reflected slowly (e.g., decrease in acceleration at a moment cause stabilizer state 406 for a subsequent moment to be decreased).

The changes in values of the stabilizer state 406 may be limited. For example, the rate of change in values of the stabilizer state 406 may be limited by an increase-rate cap and/or a decrease-rate cap. The values of the increase-rate cap and the decrease-rate cap may be the same or different. Same or different rates of changes may be used for increases and decreases in values of the stabilizer state 406. For example, the change in values of the stabilizer state 406 may be limited by a decrease-rate cap but not limited by an increase-rate cap, such that the values of the stabilizer state 406 follows the increase in angular acceleration 404 without limitation while the values of the stabilizer state 406 follows the decrease in angular acceleration 404 up to the decrease-rate cap. That is, the fastest rate at which the values of the stabilizer state 406 may decrease may be limited by the decrease-rate cap.

Such determination of the values of the stabilizer state 406 may bias the intentionality determination towards unintentionality. That is, same rate of positive and negative changes in the angular acceleration 404 may result in the intentionality determination moving more quickly away from full intentionality than from full unintentionality. Such determination of the values of the stabilizer state 406 may allow the level of attenuation applied in stabilization to be increased immediately based on increase in angular acceleration 404 (e.g., immediately increase the level of motion attenuation based on increase in unintentionality of the motion), and may restrict the rate at which the level of attenuation applied in stabilization decreases based on decrease in angular acceleration 404 (e.g., slowly decrease the level of motion attenuation based on decrease in unintentionality of the motion). The change in values of the stabilizer state 406 may be flipped to bias the intentionality determination towards intentionality.

The viewing window component 104 may be configured to determine one or more viewing windows for the visual content based on the intentionality of the motion of the image capture device/housing and/or other information. A viewing window may define one or more extents of the visual content. A viewing window may define extent(s) of the visual content viewable on one or more displays as the function of progress through the progress length of the visual content. The progress length of the visual content may be the same as or determined based on the capture duration of the visual content. A viewing window may define extent(s) of the visual content included within a video generated from the visual content. For example, a viewing window may define which spatial portions of the visual content captured by the image capture device during the capture duration is presented on display(s) and/or included within stabilized visual content.

A viewing window may be characterized by viewing directions, viewing sizes (e.g., viewing zoom, viewing magnification), viewing rotations, and/or other information. A viewing direction may define a direction of view for visual content. A viewing direction may define the angle/visual portion of the visual content at which the viewing window may be directed. A viewing direction may be defined based on rotation about an axis that defines lateral movement of the viewing window (e.g., yaw). A viewing direction may be defined based on rotation about an axis that defines vertical movement of the viewing window (e.g., pitch). The yaw and pitch values of the viewing direction may determine the location of the viewing window within images/video frames captured by the image capture device.

A viewing size may define a size of the viewing window. A viewing size may define a size (e.g., size, magnification, viewing angle) of viewable extents of visual content. A viewing size may define the dimensions of the viewing window. In some implementations, a viewing size may define different shapes of the viewing window/viewable extents. For example, a viewing window may be shaped as a rectangle, a triangle, a circle, and/or other shapes. A viewing rotation may define a rotation of the viewing window. A viewing rotation may define one or more rotations of the viewing window about one or more axis. For example, a viewing rotation may be defined based on rotation about an axis corresponding to a viewing direction (e.g., roll).

The viewing window(s) may be determined as the function of progress through the capture duration. That is, one or more of viewing direction, viewing rotation, and/or viewing size may be determined for different parts of the capture duration. For example, different placement (determined based on viewing direction, viewing rotation, and/or viewing size) of the viewing window may be determined for different parts of the capture duration. The viewing window(s) may be determined for different time points and/or different time durations within the capture duration. The viewing window(s) may be determined for different images/video frames and/or different groups of images/video frames captured during the capture duration.

A viewing window may be used to provide a punchout of the visual content. A punchout of the visual content may refer to an output of one or more portions of the visual content for presentation (e.g., current presentation, future presentation based on video generated using the punchout).

A punchout of the visual content may refer to extents of the visual content that is obtained for viewing and/or extraction. The extents of the visual content viewable/extracted within the viewing window may be used to provide views of different spatial portions of the visual content.

For example, the visual content may include a field of view, and the punchout of the visual content may include the entire extent of the visual content (the visual content within the entire field of view) or one or more extents of the visual content (the visual content within one or more portions of the field of view). A viewing window may define extents of the visual content to be included within a punchout of the visual content as the function of progress through the progress length/capture duration of the visual content. A viewing window may correspond to the entire duration of the progress length/capture duration or for one or more portions (e.g., portions including moments of interest) of the progress length/capture duration. The punchout of the visual content may be presented on one or more displays, included in one or more videos, and/or otherwise used for presenting the visual content.

Determining a viewing window for visual content based on the intentionality of the motion of the image capture device/housing may include determining one or more of viewing direction, viewing rotation, and/or viewing size of the viewing window based on the intentionality of the motion. Placement (viewing direction, viewing rotation, and/or viewing size) of the viewing window may be determined based on the intentionality of the motion and/or other information. The viewing window component 104 may be configured to determine how the viewing window should be oriented with respect to the field of view of the visual content (images, video frames). For example, the intentionality of the motion may be used to determine how much and in what direction(s) the viewing window is to be moved in lateral direction, moved in vertical direction, and/or rotated. The viewing window may be oriented with respect to the field of view of the visual content to provide a punchout of the visual content that is stable with respect to prior and/or next punchout of the visual content. For example, the viewing window may be oriented with respect to the field of view of images/video frames captured by the image capture device to provide a punchout of the images/video frames such that the presented content appears to have been captured with a stable/more stable image capture device (e.g., a punchout of a video frame being stable/more stable with a punchout of the preceding video frame and/or a subsequent video frame).

Figure 5:
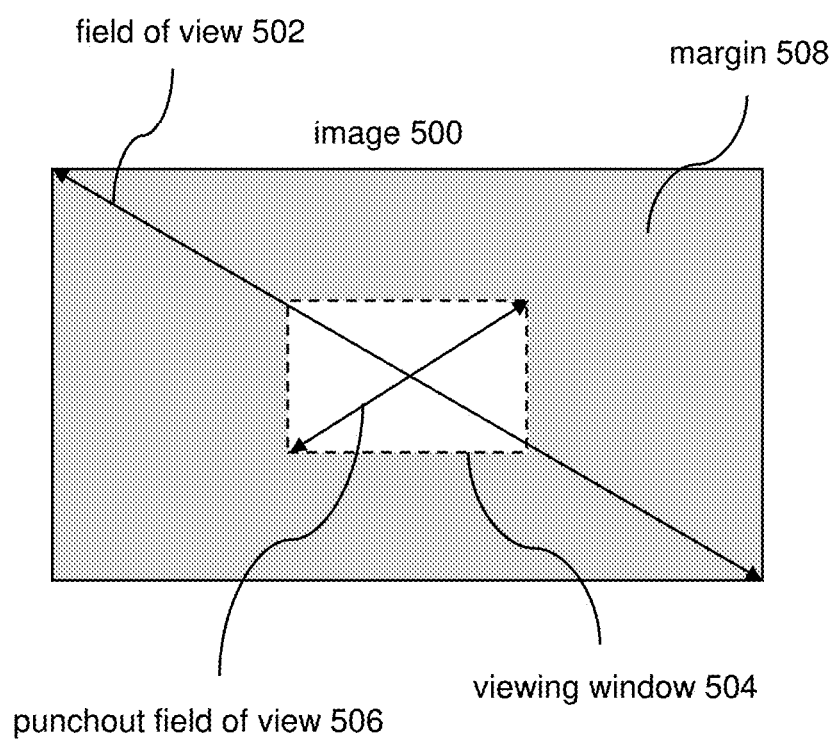
FIG. 5 illustrates an example orientation of a viewing window with respect to an image.

For example, FIG. 5 illustrates an example orientation of a viewing window 504 with respect to an image 500. The image 500 may have a field of view 502. The viewing window 504 may have a punchout field of view 506, defining the size of the viewing window 504. In FIG. 5, the viewing window 504 may be oriented in the center of the field of view 502. Such placement of the viewing window 504 may provide a margin 508. The margin 508 may include a difference between the field of view 502 and the punchout field of view 506. Difference between the field of view 502 and the punchout field of view 506 may define the margin 508 within which the viewing window 504 may move with respect to the field of view 502.

The amount of the margin 508 may limit the extent to which the viewing window 504 may deviate from the center of the field of view 502 to provide stabilized visual content. Larger margin may allow for larger deviation of the viewing window 504 from the center of the field of view 502 while smaller margin may allow for smaller deviation of the viewing window 504 from the center the field of view 502.

A viewing window for the visual content may be determined as the function of progress through the capture duration based on the intentionality of the motion of the image capture device/housing such that the viewing window for the visual content is centered on a center of the field of view of the visual content (e.g., center of the images/video frames) for one or more portions of the capture duration in which the intentionality of the motion of the image capture device/housing is determined as being fully intentional. That is, when the motion of the image capture is determined as being fully intentional, the viewing window may be centered in field of view of the visual content (e.g., such as shown in FIG. 5) and/or moved towards the center of the field of view of the visual content. Such placement of the viewing window may preserve the intended motion of the image capture device/housing in the stabilized visual content.

A viewing window for the visual content may be determined as the function of progress through the capture duration based on the intentionality of the motion of the image capture device/housing such that the viewing window deviates/is allowed to deviate from the center of the field of view of the visual content (e.g., center of the images/video frames) for one or more portions of the capture duration in which the intentionality of the motion of the image capture device/housing is determined as being fully unintentional. That is, when the motion of the image capture is determined as being fully unintentional, the viewing window may be deviate from the center of the field of view of the visual content so that visual content within the viewing window is stabilized across multiple images/video frames. Such placement of the viewing window may remove/attenuate the unintended motion of the image capture device/housing in the stabilized visual content.

Figure 6A:
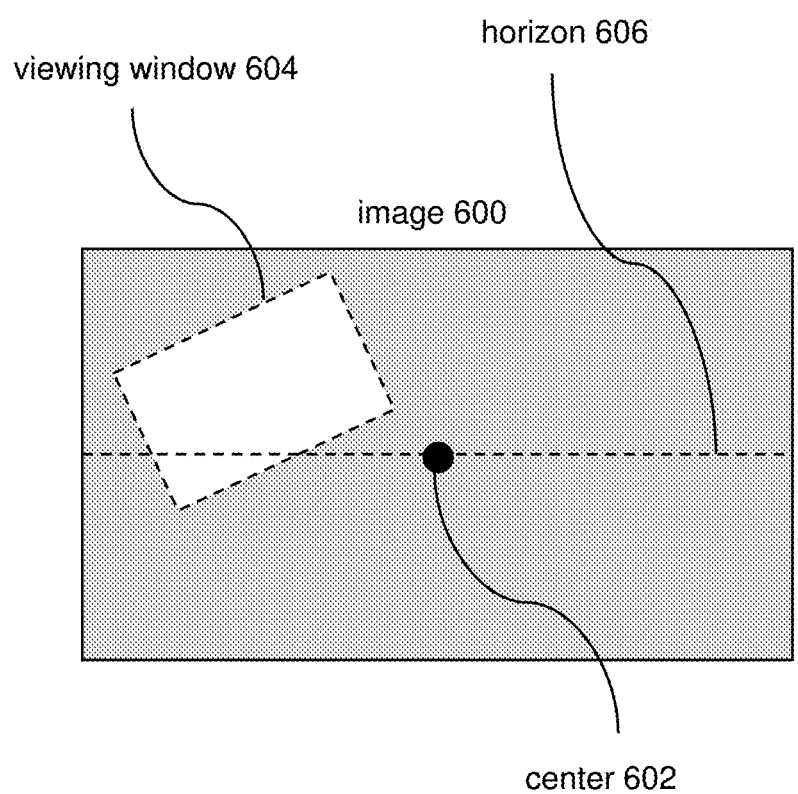
FIGS. 6A-6B illustrate example orientations of a viewing window with respect to an image.

For example, FIG. 6A illustrates an example orientation of a viewing window 604 with respect to an image 600. The viewing window 604 may be placed within the image 600 such that the viewing window 604 is not centered on a center 602 of the image 600. The viewing window 604 may be placed in such a manner to provide stabilized visual content. For example, the image 600 may represent a video frame captured by an image capture device, and the image 500 may represent a preceding video frame captured by the image capture device. Between the moments the image capture device captured the image 500 and the image 600, the image capture device may have experience motion, such as being rotated to the right, being panned to the right, and being pitched downwards. Such motion may result in the portion of the scene that was previously captured in the portion of the image 500 within the viewing window 504 to be captured in the portion of the image 600 within the viewing window 604. The placement of the viewing window 604 within the image 600 as shown in FIG. 6 may compensate for the motion of the image capture device. A presentation of the portion of the image 500 within the viewing window 504 followed by the portion of the image 600 within the viewing window 604 may not include the motion of the image capture device. For the portion(s) of the capture duration in which the intentionality of the motion of the image capture device/housing is determined as being fully unintentional, the viewing window may be allowed to deviate from the center of the viewing window as long the viewing window does not exceed the field of view of the visual content (e.g., not go beyond the margin).

In some implementations, placement of the viewing window for the visual content with respect to the field of view of the visual content may be determined based on a centering parameter and/or other information. A centering parameter may refer to a parameter for determining movement of a viewing window towards the center of the field of view. The centering parameter may move the viewing window towards the center of the field of view. The centering parameter may control the extent to which a viewing window that is not centered in the field of view of the visual content may be moved towards the center of the visual content. For example, the centering parameter may impact the speed with which an uncentered viewing window may be moved towards the center of the visual content.

For example, referring to FIG. 6A, the centering parameter may determine with what speed the viewing window 604 may be panned to the right, pitched downwards, and/or rotated clockwise so that the viewing window 604 may be centered at the center 602. The centering parameter may determine how the viewing window 604 may be moved so that the viewing window may be placed within the image 600 as the viewing window 504 is placed within the image 500. The impact of the centering parameter may be adjusted based on the value of the centering parameter (e.g., higher value to increase impact and lower value to decrease impact, or vice versa).

The impact of the centering parameter may change based on the amount of deviation of (departure of, difference between placement of) the viewing window 600 from the center 602 and/or other information. For example, the speed with which the viewing window 604 may be panned to the right and/or pitched downwards may depend on the angular distance between the center 602 and the lateral deviation and/or the vertical deviation of the viewing window 604 from the center 602. The speed with which the viewing window 604 may be rotated clockwise may depend the angular rotation of the viewing window 604 from horizon 606. For example, the speed of the movement of the viewing window 604 may be linearly related to the amount of deviation such that the speed (1) linearly increases with larger angular distance between the viewing window 600 and the center 602, (2) linearly decreases as the viewing window 600 gets closer to the center 602, and (3) drops to zero when the viewing window 600 is centered at the center 602. Other relationship (e.g., non-linear) between the speed of viewing window movement and amount of deviation are contemplated.

The impact of the centering parameter on the placement of the viewing window may be determined based on the intentionality of the motion of the image capture device/housing and/or other information. For example, when the intentionality of the motion is determined to be fully intentional, the impact of the centering parameter may be maximized/increased. The impact of the centering parameter may be maximized/increased to increase the speed with which the viewing window is moved to the center of the field of view of the visual content when the intentionality of the motion is determined to be fully intentional.

When the intentionality of the motion is determined to be fully unintentional, the impact of the centering parameter may be minimized/eliminated. The impact of the centering parameter may be minimized/eliminated to so that deviation of the viewing window from the center of the field of view of the visual content does not cause the viewing window to move towards the center. That is, when the intentionality of the motion is determined to be fully unintentional, deviation of the viewing window from the center of the field of view of the visual content may be unhindered (not impacted) by the centering parameter.

When the intentionality of the motion is determined to be intermediately intentional, the impact of the centering parameter may fall within a range (e.g., range of maximum corresponding to fully intentional motion and minimum corresponding to fully unintentional motion). The impact of the centering parameter may be determined based on the value of intentionality between the fully intentional value and the fully unintentional value. Values of intentionality closer to the fully intentional value may result in increased impact of the centering parameter and values of intentionality closer to the fully non-intentional value may result in decreased impact of the centering parameter.

In some implementations, placement of the viewing window for the visual content with respect to the field of view of the visual content may be determined based on an inertia parameter and/or other information. An inertia parameter may refer to a parameter for determining changes in the speed with which a viewing window may move. The inertia parameter may maintain one or more portions of speed of movement (e.g., pan speed, pitch speed, rotation speed, a percentage/fraction of speed, pan acceleration, pitch acceleration, rotation acceleration, a percentage/fraction of acceleration) of the viewing window. For example, the inertia parameter may impact to what extent the speed and/or acceleration of the viewing window changes between points/durations of time within the capture duration. The inertia parameter may impact to what extent the speed and/or acceleration of the viewing window changes between images/video frames captured during the capture duration. The inertia parameter may limit the amount by which speed and/or acceleration of the viewing window may be changed. Such limitation on the speed of movement of the viewing window may result in smoother movement of the viewing window for visual content stabilization.

Figure 6B:
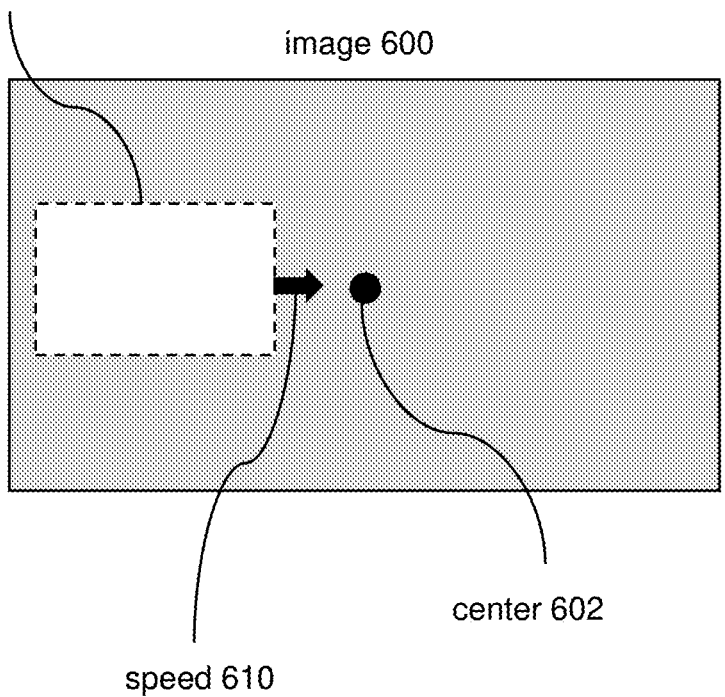

For example, FIG. 6B illustrates a viewing window 608 placed to the left of the center 602 of the image 600. The viewing window 608 may be moving to the right (based on the centering parameter, to stabilize visual content) with a speed 610. The speed 610 may represent the extent by which the position of the viewing window 608 may change between adjacent points/durations of time and/or adjacent images/video frames. The inertia parameter may determine how much the speed 610 may change between adjacent points/durations of time and/or adjacent images/video frames. The impact of the inertia parameter may be adjusted based on the value of the inertia parameter (e.g., higher value to increase impact and lower value to decrease impact, or vice versa).

The impact of the inertia parameter on the placement of the viewing window may be determined based on the intentionality of the motion of the image capture device/housing and/or other information. For example, when the intentionality of the motion is determined to be fully unintentional, the impact of the inertia parameter may be maximized/increased. The impact of the inertia parameter may be maximized/increased to allow greater change in the speed with which the viewing window is moved when the intentionality of the motion is determined to be fully unintentional. When the intentionality of the motion is determined to be fully intentional, the impact of the inertia parameter may be minimized/decreased. The impact of the inertia parameter may be minimized/decreased to allow less change in the speed with which the viewing window is moved when the intentionality of the motion is determined to be fully intentional.

When the intentionality of the motion is determined to be intermediately intentional, the impact of the inertia parameter may fall within a range (e.g., range of maximum corresponding to fully unintentional motion and minimum corresponding to fully intentional motion). The impact of the inertia parameter may be determined based on the value of intentionality between the fully intentional value and the fully unintentional value. Values of intentionality closer to the fully intentional value may result in decreased impact of the inertia parameter and values of intentionality closer to the fully non-intentional value may result in increased impact of the inertia parameter.

In some implementations, placement of the viewing window for the visual content with respect to the field of view of the visual content may be determined based on a deviation parameter and/or other information. A deviation parameter may refer to a parameter that defines boundaries of the movement of the viewing window within the field of view of the visual content. The deviation parameter may limit deviation of the viewing window from the center of the field of view and/or other information. The deviation parameter may define maximum angular distances of the viewing window from the center of the field of view. Use of the deviation parameter may render the stabilization of visual content more reactive in modes exposing more stabilization margin, such as linear field of view and/or zoomed modes.

Figure 7A:
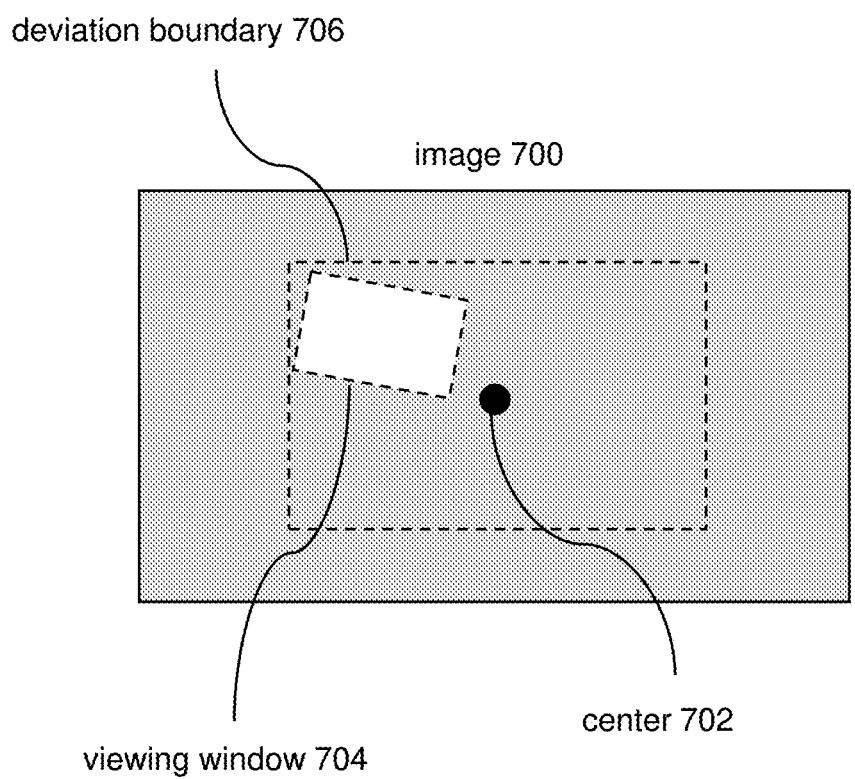
FIG. 7A illustrates example horizontal and vertical deviation limits from the center of an image.

For example, the deviation parameter may limit the movement of the viewing window to an extent smaller than the field of visual of the visual content. FIG. 7A illustrates an example deviation boundary 706 for an image 700. The deviation boundary 706 may define horizontal and vertical deviation limits of a viewing window 704 from a center 702 of the image 700. the deviation boundary 706 may be smaller than the field of view of the image 700. Thus, the viewing window 704 may be moved within a smaller extent (extent of the deviation boundary 706) within the image 700, rather than the entire extent of the image 700. A deviation boundary may or may not be centered on the center 702 of the image 700. A deviation boundary may or may not be symmetric about one or more center lines (horizontal center line, vertical center line) of the image 700. Other shapes of deviation boundary are contemplated.

Figure 7B:
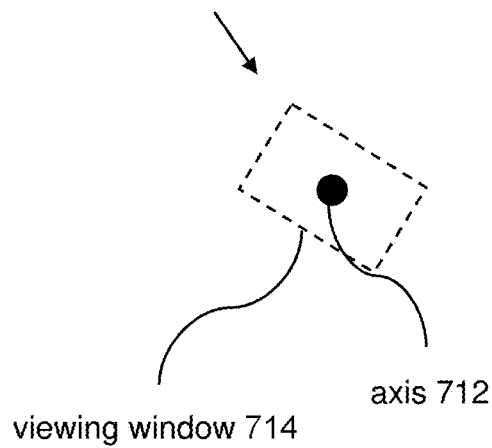
FIG. 7B illustrates example rotational deviation limits around an axis.
Figure 7B:
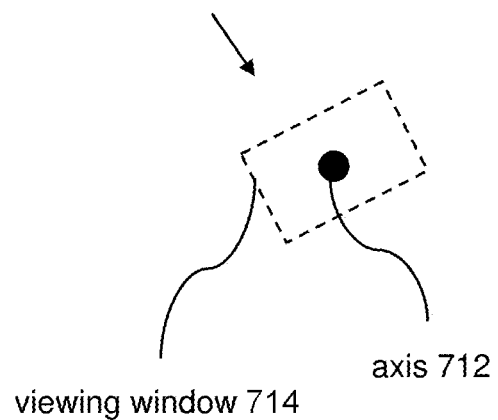

The deviation parameter may limit the rotation of the viewing window about an axis (e.g., roll axis, axis of the viewing direction). FIG. 7B illustrates example rotational deviation limits around an axis 712. For example, the deviation parameter may limit clockwise rotation of a viewing window 714 about the axis 712 to a maximum positive rotation 710. the deviation parameter may limit counter-clockwise rotation of the viewing window 714 about the axis 712 to a maximum negative rotation 720. The rotation amount of the maximum positive rotation 710 may be the same or different from the rotation amount of the maximum negative rotation 720.

In some implementations, the deviation limits (e.g., deviation boundary, rotational deviation limits) of the deviation parameter may change based on the intentionality of the motion. For example, when the intentionality of the motion is determined to be fully unintentional, the deviation limits may be maximized/increased. The deviation limits may be maximized/increased to allow greater deviation of the viewing window from the center of the field of view of the visual content when the intentionality of the motion is determined to be fully unintentional. When the intentionality of the motion is determined to be fully intentional, the deviation limits may be minimized/decreased. The deviation limits may be minimized/decreased to allow less deviation of the viewing window from the center of the field of view of the visual content when the intentionality of the motion is determined to be fully intentional.

In some implementations, when the intentionality of the motion is determined to be intermediately intentional, the deviation limits may fall within a range (e.g., maximum limit corresponding to fully unintentional motion and minimum limit corresponding to fully intentional motion). The deviation limits may be determined based on the value of intentionality between the fully intentional value and the fully unintentional value. Values of intentionality closer to the fully intentional value may result in decreased deviation limits and values of intentionality closer to the fully non-intentional value may result in increased deviation limits.

The generation component 106 may be configured to generate stabilized visual content of one or more videos based on the viewing window(s) and/or other information. The stabilized visual content may include a punchout of the extent(s) of the visual content within the viewing window(s). Stabilized visual content may be generated as video frames including extent(s) of the visual content within the viewing window(s). Stabilized visual content may be generated as outputs of portions of the visual captured by the image capture device, with the outputted portions including extent(s) of the visual content within the viewing window(s). Inclusion of the extent(s) of the visual content within the viewing windows in video may effectuate stabilization of the visual content via selective cropping. The portions of the visual content that is cropped for stabilization may depend on the intentionality of the motion of the image capture device/housing and/or other information. The portions of the visual content that is cropped for stabilization may depend on one or more of the centering parameter, the inertia parameter, the deviation parameter, and/or other parameters.

In some implementations, one or more portions of the visual content within the viewing window(s) may be warped. Warping of the visual content may provide for different perspectives of the visual content (e.g., different perspective of things and/or scenes captured within images/video frames). The different perspectives may correspond to how the visual content would have look had the visual content been captured by the image capture device from different position and/or different angle.

The stabilized visual content generated by the generation component 106 may be defined by stabilized visual information. Stabilized visual information may define an encoded version/copy of the stabilized visual content and/or instructions for rendering the stabilized visual content. For example, the stabilized visual content information may define an encoded version/copy of the video frames that include portions (within the viewing window(s)) of the original video frames captured by the image capture device, and the stabilized visual information (e.g., video file) may be opened in a video player for presentation of the stabilized visual content. The stabilized visual content information may define instructions to render the stabilized visual content for presentation. For example, the stabilized visual content information may define a director track that includes information as to which visual portions of the images captured by the image capture device should be presented. The director track may include information on the location, size, shape, and/or rotation of the punchout of images to be used to provide a stabilized view of the images. A video player may use the director track to retrieve the relevant visual portions of the images when the stabilized visual content is opened and/or is to be presented.

The stabilization technique described herein may provide a light-weight approach in stabilization videos. The stabilization technique described herein may be performed with light consumption of computing resources (e.g., computing power, time, memory, power consumption). The stabilization technique described herein may be performed for a video while the video is being captured. The stabilization technique described herein may be performed for a video to provide a preview of the video being captured. For example, the stabilization technique described herein may be used to provide a preview of the video being captured by an image capture device. The stabilized visual content of a video may be provided as a preview of the video while the video is being captured. The preview may be presented on the display(s) of the image capture device and/or other display(s).

In some implementations, the stabilized visual content may be different from visual content of the video. That is, the stabilized visual content that is generated using the stabilization technique described herein may be different from the actual visual content of the video that is captured. This may occur due to use of different stabilization techniques. For example, the stabilized visual content may be generated as described herein to provide a preview of a video being captured by an image capture device. The video that is captured by the image capture device may be stabilized using a different stabilization technique, such as a heavier-weight stabilization technique and/or a stabilization technique that cannot be performed contemporaneously with capture of the visual content. Use of heavier-weight/non-contemporaneous stabilization technique to generate the video may provide a more stable video than the use of the stabilization technique described herein. However, it may be difficult, impractical, and/or impossible to use such heavier-weight/non-contemporaneous stabilization technique to provide a live preview of the video being captured. Thus, the stabilization technique described herein may be used to provide the live preview of the video being captured, while another stabilization technique may be used to stabilize the video being generated.

The generation component 106 may be configured effectuate storage of the stabilized visual information and/or other information in one or more storage media. For example, the stabilized visual information may be stored in the electronic storage 13, remote storage locations (storage media located at/accessible through a server), and/or other locations. In some implementations, the generation component 106 may effectuate storage of the stabilized visual information through one or more intermediary devices. For example, the processor 11 may be located within a computing device without a connection to the storage device (e.g., the computing device lacks WiFi/cellular connection to the storage device). The generation component 106 may effectuate storage of the stabilized visual information through another device that has the necessary connection (e.g., the computing device using a WiFi/cellular connection of a paired mobile device, such as a smartphone, tablet, laptop, to store information in one or more storage media). Other storage locations for and storage of the stabilized visual information are contemplated.

While the description herein may be directed to images and videos, one or more other implementations of the system/method described herein may be configured for other types media content. Other types of media content may include one or more of audio content (e.g., music, podcasts, audiobooks, and/or other audio content), multimedia presentations, images, slideshows, visual content (e.g., one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
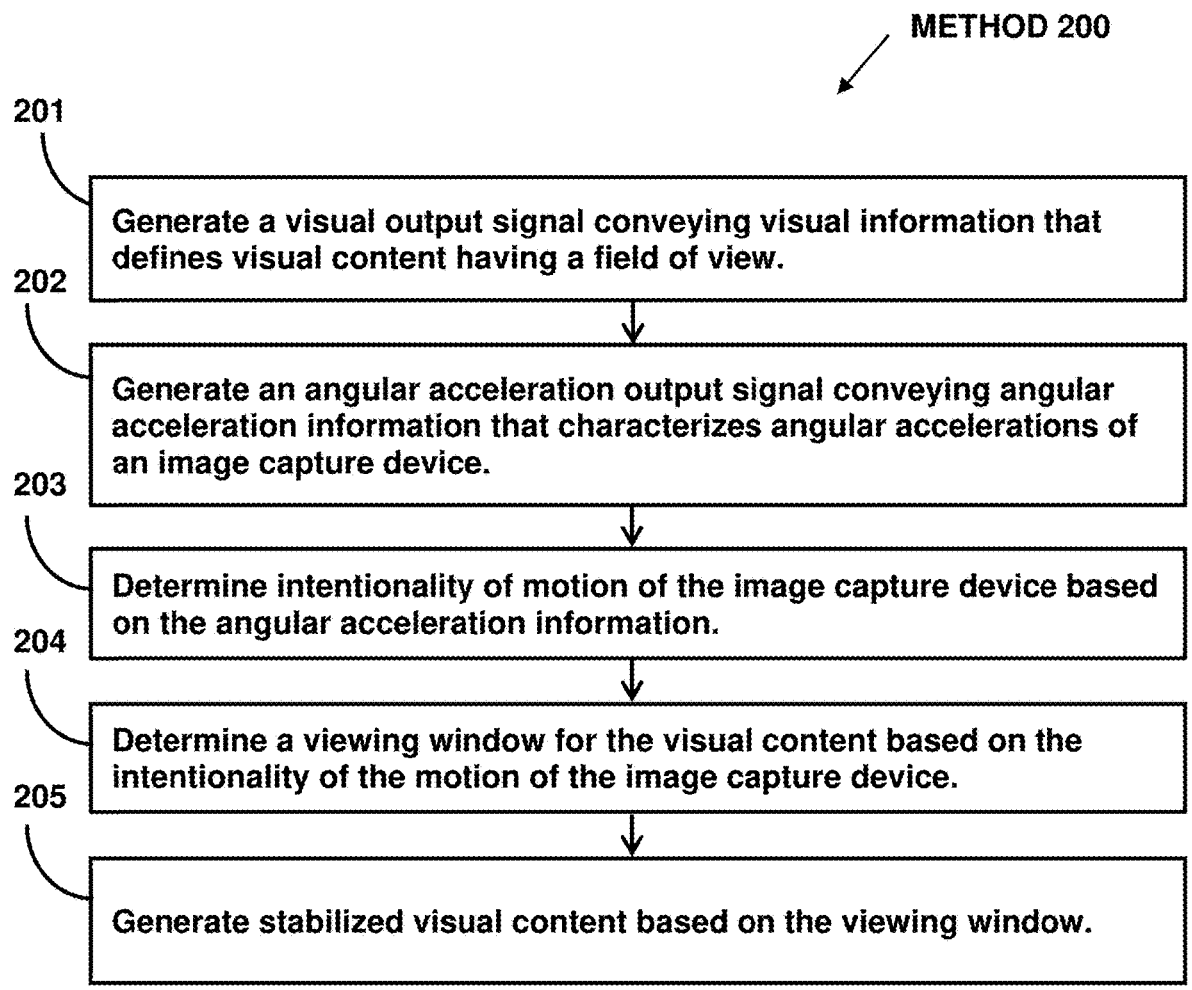
FIG. 2 illustrates an example method for stabilizing videos.

FIG. 2 illustrates method 200 for stabilizing videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, a visual output signal may be generated. The visual output signal may convey visual information that defines visual content having a field of view. In some implementation, operation 201 may be performed by a component the same as or similar to the image sensor 306 (Shown in FIG. 3 and described herein).

At operation 202, an angular acceleration output signal may be generated. The angular acceleration output signal may convey angular acceleration information that characterizes angular accelerations of an image capture device at different moments within a capture duration. In some implementation, operation 202 may be performed by a component the same as or similar to the motion sensor 308 (Shown in FIG. 3 and described herein).

At operation 203, intentionality of motion of the image capture device may be determined based on the angular acceleration information. The intentionality of the motion of the image capture device may be determined as a function of progress through the capture duration. In some implementation, operation 203 may be performed by a processor component the same as or similar to the intentionality component 102 (Shown in FIG. 1 and described herein).

At operation 204, a viewing window for the visual content may be determined based on the intentionality of the motion of the image capture device. The viewing window may define one or more extents of the visual content. In some implementation, operation 204 may be performed by a processor component the same as or similar to the viewing window component 104 (Shown in FIG. 1 and described herein).

At operation 205, stabilized visual content may be generated based on the viewing window. The stabilized visual content may include a punchout of the extent(s) of the visual content within the viewing window. In some implementation, operation 205 may be performed by a processor component the same as or similar to the generation component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for stabilizing videos, the system comprising:
one or more physical processors configured by machine-readable instructions to:
obtain visual information, the visual information defining visual content captured by an image capture device during a capture duration, the visual content having a field of view;
obtain angular acceleration information, the angular acceleration information characterizing angular accelerations of the image capture device at different moments within the capture duration:
determine intentionality of motion of the image capture device as a function of progress through the capture duration based on the angular acceleration information, wherein:
the intentionality of the motion of the image capture device is determined as being fully intentional based on the angular acceleration of the image capture device being smaller than a fully intentional angular acceleration threshold value; and the intentionality of the motion of the image capture device is determined as being fully unintentional based on the angular acceleration of the image capture device being greater than a fully unintentional angular acceleration threshold value, the fully intentional angular acceleration threshold value being smaller than the fully unintentional angular acceleration threshold value;

determine a viewing window for the visual content as the function of progress through the capture duration based on the intentionality of the motion of the image capture device, the viewing window defining one or more extents of the visual content; and generate stabilized visual content of a video based on the viewing window, the stabilized visual content including a punchout of the one or more extents of the visual content within the viewing window.

2. The system of claim 1, wherein the one or more physical processors are carried by the image capture device.

3. The system of claim 2, wherein the image capture device further carries a display, and the stabilized visual content is presented on the display as a preview of the video.

4. The system of claim 3, wherein the stabilized visual content is different from visual content of the video.

5. The system of claim 1, wherein determination of the intentionality of the motion of the image capture device as being intermediately intentional includes determination of a value of intentionality between a fully intentional value and a fully unintentional value.

6. The system of claim 1, wherein the intentionality of the motion of the image capture device is determined as values of a stabilizer state variable.

7. The system of claim 1, wherein the viewing window for the visual content is determined as the function of progress through the capture duration based on the intentionality of the motion of the image capture device such that the viewing window for the visual content is centered on a center of the field of view for a portion of the capture duration in which the intentionality of the motion of the image capture device is determined as being fully intentional and the viewing window for the visual content deviates from the center of the field of view for a portion of the capture duration in which the intentionality of the motion of the image capture device is determined as being fully unintentional.

8. The system of claim 7, wherein placement of the viewing window for the visual content with respect to the field of view of the visual content is determined based on a centering parameter that moves the viewing window towards the center of the field of view, wherein an impact of the centering parameter on the placement of the viewing window is determined based on the intentionality of the motion of the image capture device.

9. The system of claim 7, wherein placement of the viewing window for the visual content with respect to the field of view of the visual content is determined based on an inertia parameter that maintains a portion of speed of movement of the viewing window, wherein an impact of the inertia parameter on the placement of the viewing window is determined based on the intentionality of the motion of the image capture device.

10. The system of claim 7, wherein placement of the viewing window for the visual content with respect to the field of view of the visual content is determined based on a deviation parameter that limits deviation of the viewing window from the center of the field of view.

11. A method for stabilizing videos, the method performed by a computing system including one or more processors, the method comprising:

obtaining, by the computing system, visual information, the visual information defining visual content captured by an image capture device during a capture duration, the visual content having a field of view;

obtaining, by the computing system, angular acceleration information, the angular acceleration information characterizing angular accelerations of the image capture device at different moments within the capture duration;

determining, by the computing system, intentionality of motion of the image capture device as a function of progress through the capture duration based on the angular acceleration information, wherein:

the intentionality of the motion of the image capture device is determined as being fully intentional based on the angular acceleration of the image capture device being smaller than a fully intentional angular acceleration threshold value; and the intentionality of the motion of the image capture device is determined as being fully unintentional based on the angular acceleration of the image capture device being greater than a fully unintentional angular acceleration threshold value, the fully intentional angular acceleration threshold value being smaller than the fully unintentional angular acceleration threshold value;

determining, by the computing system, a viewing window for the visual content as the function of progress through the capture duration based on the intentionality of the motion of the image capture device, the viewing window defining one or more extents of the visual content; and generating, by the computing system, stabilized visual content of a video based on the viewing window, the stabilized visual content including a punchout of the one or more extents of the visual content within the viewing window.

12. The method of claim 11, wherein the one or more processors are carried by the image capture device.

13. The method of claim 12, wherein the image capture device further carries a display, and the stabilized visual content is presented on the display as a preview of the video.

14. The method of claim 13, wherein the stabilized visual content is different from visual content of the video.

15. The method of claim 11, wherein determination of the intentionality of the motion of the image capture device as being intermediately intentional includes determination of a value of intentionality between a fully intentional value and a fully unintentional value.

16. The method of claim 11, wherein the intentionality of the motion of the image capture device is determined as values of a stabilizer state variable.

17. The method of claim 11, wherein the viewing window for the visual content is determined as the function of progress through the capture duration based on the intentionality of the motion of the image capture device such that the viewing window for the visual content is centered on a center of the field of view for a portion of the capture duration in which the intentionality of the motion of the image capture device is determined as being fully intentional and the viewing window for the visual content deviates from the center of the field of view for a portion of the capture duration in which the intentionality of the motion of the image capture device is determined as being fully unintentional.

18. The method of claim 17, wherein placement of the viewing window for the visual content with respect to the field of view of the visual content is determined based on a centering parameter that moves the viewing window towards the center of the field of view, wherein an impact of the centering parameter on the placement of the viewing window is determined based on the intentionality of the motion of the image capture device.

19. The method of claim 17, wherein placement of the viewing window for the visual content with respect to the field of view of the visual content is determined based on an inertia parameter that maintains a portion of speed of movement of the viewing window, wherein an impact of the inertia parameter on the placement of the viewing window is determined based on the intentionality of the motion of the image capture device.

20. The method of claim 17, wherein placement of the viewing window for the visual content with respect to the field of view of the visual content is determined based on a deviation parameter that limits deviation of the viewing window from the center of the field of view.

* * * * *